(12) United States Patent
Miller et al.

(10) Patent No.: US 7,062,549 B1
(45) Date of Patent: Jun. 13, 2006

(54) METHODS AND SYSTEMS FOR COMMUNICATIONS PATH ANALYSIS

(75) Inventors: James R. Miller, Lawrenceville, GA (US); Robert J. Bates, Alpharetta, GA (US); Fredrick L. Edwards, EllenWood, GA (US); Jean-Pierre Zaiter, Dacula, GA (US); Christopher M. Drew, Alpharetta, GA (US); Joel E. Cordsmeyer, Tucker, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 648 days.

(21) Appl. No.: 09/999,433

(22) Filed: Nov. 15, 2001

(51) Int. Cl.
*G06F 15/173* (2006.01)

(52) U.S. Cl. ............... 709/223; 709/224; 370/352; 370/357; 370/401

(58) Field of Classification Search ........ 709/223–226, 709/218, 249, 220, 217, 201–203; 370/352, 370/357
See application file for complete search history.

(56) References Cited

U.S. PATENT DOCUMENTS

| | | | | |
|---|---|---|---|---|
| 5,881,131 | A | | 3/1999 | Farris et al. ............... 379/27 |
| 5,889,470 | A | | 3/1999 | Kaycee et al. ......... 340/825.07 |
| 5,935,209 | A | * | 8/1999 | Budhraja et al. ........... 709/223 |
| 5,946,372 | A | * | 8/1999 | Jones et al. .............. 379/10.01 |
| 6,115,743 | A | * | 9/2000 | Cowan et al. .............. 709/224 |
| 6,118,936 | A | * | 9/2000 | Lauer et al. ............... 709/224 |
| 6,611,867 | B1 | * | 8/2003 | Bowman-Amuah ......... 709/224 |
| 6,708,207 | B1 | * | 3/2004 | Sabelhaus et al. .......... 709/223 |
| 2002/0150108 | A1 | * | 10/2002 | Nattkemper et al. ........ 370/397 |

OTHER PUBLICATIONS

Mercury Interactive Corporation, "*Ensuring The Performance of Hosted E-Business Applications*", Copyright Dec. 1999, pp. 1-15.

Mercury Interactive Corporation, "*Mercury Interactive's Topaz: Correlating End-User Performance Issues to the Source of the Problem within the Web Infrastructure*", Copyright Dec. 2000, pp. 1-12.

Mercury Interactive Corporation, "*Topaz 2.0: Web Application Performance Management*", Copyright Dec. 2000, pp. 1-4.

International Data Corporation, Development Life-Cycle Management, Bulletin, "*Mercury Interactive's Topaz: Managing Internet Application Performance*", Copyright Aug. 1999, pp. 1-6.

* cited by examiner

*Primary Examiner*—Jeffrey Pwu
(74) *Attorney, Agent, or Firm*—Cantor Colburn LLP

(57) ABSTRACT

The present invention provides an automated mechanism for technicians located remotely from a network operations center to query a communications system for the status of communications paths. An automated capability is also provided for the remote management and testing of network components along a communications path in order to more efficiently diagnose network anomalies.

9 Claims, 8 Drawing Sheets

Status/Test Request Form

- Operator I.D. — 310
- Password — 320
- Circuit Numbers — 330
- Status — 340

Installation Status Report

| Circuit Type | Circuit Number | Installed/ Scheduled | Date |
|---|---|---|---|
| A | 404/555-1122 | Y | 070801 |
| A | 404/555-0980 | Y | 080101 |
| A | 404/555-2120 | Y | 120401 |
| A | 404/555-3878 | N | UNK |

TEST   EXIT

FIG. 5

METHODS AND SYSTEMS FOR COMMUNICATIONS PATH ANALYSIS

FIELD OF INVENTION

The present invention relates generally to the field of telecommunications network management. More particularly, the present invention relates to communications path analysis.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

In a conventional environment, obtaining circuit-status information and remotely testing network elements in a telecommunications network are very technician-intensive tasks. An example of such a telecommunications network is a Digital Subscriber Line (DSL) network, which is offered by Regional Bell Operating Companies (RBOCs) to Network Service Providers (NSPs). NSPs, also known as Internet Service Providers (ISPs), subsequently offer high-speed Internet access to their residential, commercial, and academic customers via the DSL network.

Conventionally, Network Service Provider (NSP) technicians call Regional Bell Operating Company (RBOC) technicians to determine whether NSP Digital Subscriber Line (DSL) circuits have been provisioned by the RBOC. This conventional process is employee-intensive for both the NSP and the RBOC, typically requiring NSP technicians to call RBOC technicians, who must then log into multiple management systems to ascertain the status of the circuit or circuits in question. Such a conventional process may engage NSP and RBOC employees for long periods of time.

Additionally, when a NSP technician wants to test network elements in an attempt to isolate a fault, a similar process is often carried out in a conventional environment. The NSP technician must call a RBOC technician and request that tests be performed on a certain network element. The RBOC technician will then perform the requested tests and report the results to the NSP technician. As with conventional circuit provisioning status determinations, such a process may engage NSP and RBOC employees for long periods of time.

Another conventional method of providing network element test results and circuit status information to a requesting NSP technician involves the electronic transfer of work order or trouble ticket status messages. Such a method is often implemented using email. A NSP technician sends an email message with an attached work order or trouble ticket and requests circuit status information or a testing of at least one network element. The response from the RBOC technician is an email containing an attachment of the circuit status or network element test results. Such a process, however, is still employee-intensive for both a NSP and a RBOC.

An additional conventional method is implemented by the Topaz system. Topaz is a performance monitoring application for web sites that was developed by Mercury Interactive. Although Topaz may identify network segments that are congested, it does not identify network elements that are defective.

What is needed are methods and systems that overcome the shortcomings of conventional systems. Such methods and systems should provide additional advantages, including cost effectiveness and ease of implementation.

SUMMARY

An embodiment of the present invention provides methods and systems for the management of communications circuits (i.e., paths) and the network devices implementing such circuits. Implementations of the present invention comprise at least one of a method, a process, a system, an apparatus, a computer readable medium, and a data stream.

Embodiments of the present invention comprise methods for providing communications circuit status information to a technician via a network session. Such embodiments comprise receiving a status report request, NSP or technician identification parameters, and a minimum of one communication circuit identifier. The NSP or technician identification parameters are checked against a NSP or technician authorization database and a NSP or technician access authorization is received from the appropriate authorization database. Each communications circuit is verified and a report request is made to a circuit database to provide status information (e.g., provisioning information) for each verified communications circuit. Circuit status information is received by an embodiment of the present invention. The circuit status information may then be formatted into a status report and forwarded to a follow-on system, such as the requesting technician's communications device, an email system or a storage system.

Embodiments of the present invention comprise methods for remotely managing a communications network. Such embodiments comprise receiving a communication circuit identifier, a device identifier, and at least one management command associated with the device identifier. A management request message comprising the device identifier and the management commands associated with the device identifier is then constructed and communicated to a forwarding system. A forwarding system is an intermediate system, located between the present invention and a network element that is being tested or managed, and is responsible for formatting a management request and transmitting or forwarding that request to the network element. A forwarding system may be a network management system, an element management system, or an operational support system in alternative embodiments. Management information is subsequently received from the forwarding system. The management information may then be formatted into a report and forwarded to a follow-on system, such as the requesting technician's communications device, an email system or a storage system.

Embodiments of the present invention enable remote Mechanized Loop Testing (MLT) and remote testing of Asymmetric Digital Subscriber Line (ASDL) Transceiver Unit-Remote (ATU-R) devices. Such testing is performed using an operational support system to communicate test instructions to the entities under test. Devices, entities, and elements are synonymous terms that refer to components of a communications circuit or path. The entities under test and the test scenarios for these entities are chosen by a NSP technician via a form-based selection process, as disclosed herein.

Also, embodiments of the present invention enable a network operations center manager to reduce the number of personnel required to field issues relating to the tasks of circuit status determination and circuit testing. Redundant technicians may then be applied to other service issues, resulting in cost savings and increased customer satisfaction.

Embodiments of the present invention may eliminate a large volume of calls per month that are placed by NSP technicians needing circuit status or testing information. This results in a substantial reduction in personnel and bandwidth requirements, which translates into cost savings.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 3 comprises an exemplary graphical user interface for allowing an NSP technician to query for the status of a communications circuit or to request that test commands be executed for network elements that implement the end-to-end communications circuit.

FIG. 5 comprises an exemplary graphical user interface for displaying requested status information for at least one communications circuit.

DETAILED DESCRIPTION

In the following discussion of embodiments of the present invention, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
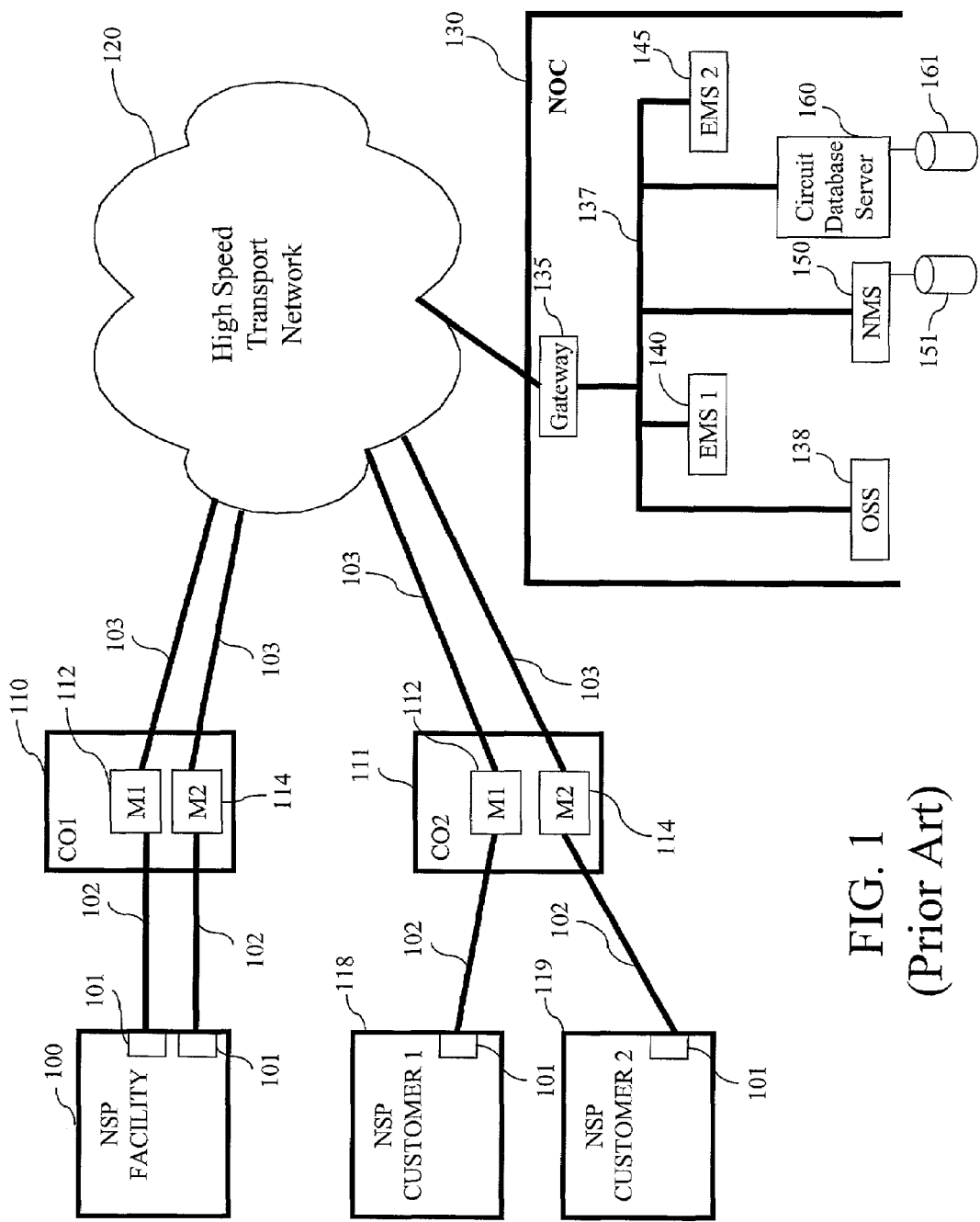
FIG. 1 illustrates a conventional communications environment.

FIG. 1 illustrates one conventional communications environment. In this environment, Asymmetrical Digital Subscriber Line (ADSL) service is sold/leased by a Regional Bell Operating Company (RBOC) to a Network Service Provider (NSP). A NSP, which is also known as an Internet Service Provider (ISP), may then offer high speed Internet access via this ADSL network to its residential, commercial, and academic customers.

In the environment shown in FIG. 1, a NSP facility 100 houses modem units 101, which interface via NSP facility communications lines 102 to multiplexer units 112, 114 housed within a telephone company facility known as a Central Office (CO) 110. The multiplexer units 112, 114 consolidate the NSP facility communication lines into high-speed communications lines 103, which deliver signals for distribution via a high-speed transport network 120.

In the embodiment shown, NSP communications lines 102 may be implemented using Asymmetric Digital Subscriber Line (ADSL) technology, and modem units 101 may be ADSL Transceiver Unit-Remote (ATU-R) devices. In alternate embodiments, high-speed communications lines 103 may comprise ATM links operating at an Optical Carrier-3 (OC-3) rate of 155 Mbps or at an OC-12 rate of 622 Mbps.

Also, in an exemplary embodiment, a CO facility 110 may comprise xDSL multiplexers 112 and 114 that are supplied by different vendors. For instance, multiplexer 112 may be an Alcatel 7300 ASAM (ADSL Subscriber Access Multiplexer), while multiplexer 114 may be a Lucent Technologies Stinger DSLAM (Digital Subscriber Line Access Multiplexer). Devices manufactured by different vendors are often managed by different, vendor-provided Element Management Systems (EMS's) 140 and 145, as explained in the subsequent discussion of FIG. 2.

At the customer end of the conventional communications network shown in FIG. 1, high speed communications lines are broken out (i.e., demultiplexed) via multiplexer units 112 and 114 located within a CO facility 111 that services NSP customer facilities 118 and 119. Furthermore, the NSP customer facilities 118 and 119 house modem units 101 for accessing the communications network via the multiplexer units 112 and 114. Customer facilities 118 and 119 may be residential, commercial or academic facilities.

The communications network shown in FIG. 1 is monitored by a RBOC facility known as a Network Operations Center (NOC) 130. A NOC 130 is a facility that houses equipment and operators for monitoring the health and status of a communications network. In addition, an Operational Support System (OSS) 138 is located in the NOC 130. The OSS 138 provides provisioning, some testing and other operational support functions for a telecommunications network.

In an exemplary NOC 130 depicted in FIG. 1, the systems responsible for monitoring a communications network are connected via a NOC Local Area Network (LAN) 137. These systems include a Network Monitoring System (NMS) 150 and Element Management Systems (EMS) 140 and 145. An EMS 140, 145 is provided by a vendor to manage network elements manufactured by that vendor. A NMS 150 stores telecommunications network management records in a NMS database 151. Examples of such records include records comprised of records fields for a circuit identifier, network element identifiers, and current error conditions. A NMS 150 also communicates with multiple EMS systems 140, 145 in order to provide integrated, multivendor network management, as defined by the ITU's (International Telecommunication Union's) Telecommunications Management Network (TMN) architecture model. In addition, a gateway 135 enables communication between these monitoring systems and network elements by providing the necessary protocol conversion to interface to a high-speed transport network 120.

A circuit database server 160 also resides on the NOC LAN 137. The circuit database server 160 provides access to a circuit database 161, which contains circuit information records that are excerpts of NMS 150 records. Such NMS 150 record excerpts are comprised of record fields for a circuit identifier and an operational/non-operational/unknown status. An example circuit database 161 is known as the TNinfo database.

In a conventional communications environment, as shown in FIG. 1, a NSP facility operator (i.e., a NSP technician) must call a NOC technician to determine the status of a communications circuit or path. In order to perform this status determination, the NOC technician often must log into at least one EMS system (140, 145), a NMS system 150, and a circuit database server 160 to determine the requested status.

Figure 2:
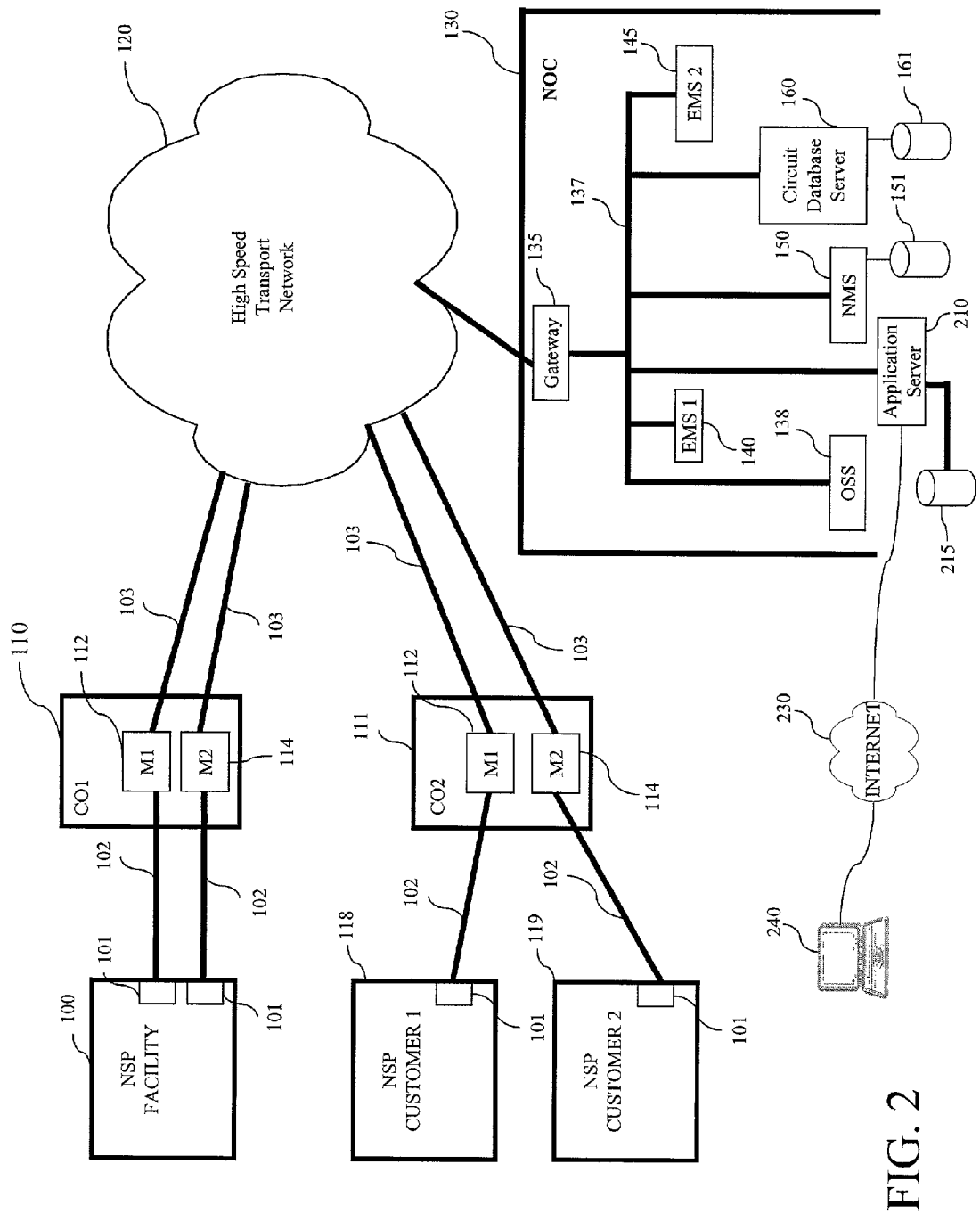
FIG. 2 illustrates the structure and operation of one embodiment of the present invention.

FIG. 2 illustrates the structure and operation of one embodiment of the present invention. In FIG. 2, an application server 210 is connected to the LAN 137 in the NOC 130 of FIG. 1. Interfacing the application server 210 to the NOC LAN 137 facilitates communications between the application server 210 and other NOC 130 systems, which were described in the discussion of FIG. 1.

The application server 210 is also interfaced to the Internet 230, thus allowing a NSP technician to remotely connect via a network interface session to the application server 210. This connection mechanism is preferably via a NSP technician's selection of a Uniform Resource Locator (URL) link within a browser application running on the NSP technician's computer 240. In alternative embodiments, another network may provide the communications path between a NSP technician's computer 240 and an application server 210.

The application server 210 also interfaces to an application server database 215. In one embodiment, the application server database 215 stores results from status and test queries made by the application server 210 to a NMS 150, a EMS 140, 150, an OSS 138, and a circuit database server 160.

In the embodiment shown in FIG. 2, when a NSP technician selects an appropriate URL for the application server 210, a browser application running on the NSP technician's computer displays a form sent to the browser by the application server 210. This URL may be represented as a text link or a graphic link (i.e., an icon or picture). An example of such a form is illustrated in FIG. 3.

FIG. 3 shows an exemplary graphical user interface form 300 for requesting a circuit status or for running tests over a communications line. The form 300 is displayed on the NSP technician's computer 240. In an embodiment, this form is entitled Status/Test Request Form 300. The Status/Test Request Form 300 is comprised of text fields (310 and 320) in which a NSP technician enters technician identification parameters comprising a technician identifier (i.e., an operator ID) and a password, respectively. A scrollable text field 330 is provided for the NSP technician to enter at least one communication circuit identifier. In various embodiments, communication circuit identifiers may be telephone numbers, IP addresses, network addresses (such as Media Access Control addresses), and VPI/VCI pairs.

The exemplary form of FIG. 3 also contains Status Button 340. When a NSP technician enters identification parameters and one or more communication circuit identifiers and selects the Status Button 340, the parameters and identifier(s) are sent by the NSP technician's computer 240 to the application server 210, and the application server 210 begins executing software which implements the algorithm represented by the flow chart of FIG. 4. Processing begins at step 405 of FIG. 4. Ultimately, an Installation Status Report 500 is presented to the NSP technician. This form is discussed with the explanation of FIG. 5.

Figure 4:
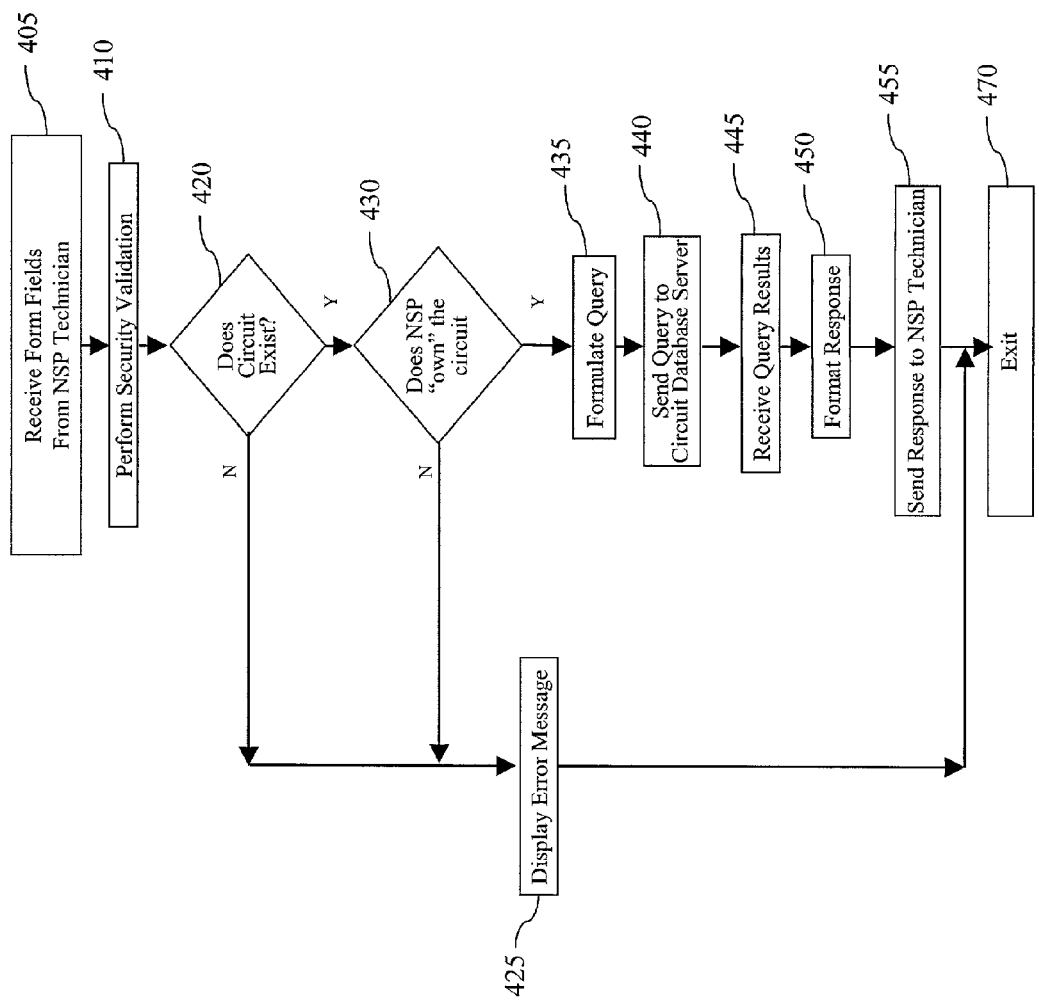
FIG. 4 comprises a flow diagram of an exemplary mechanism for providing communications circuit status information to an NSP technician.

In FIG. 4 a flow chart of an embodiment of the present invention is shown. Such an embodiment implements an exemplary mechanism for providing communications status information to a NSP technician.

In the example shown, an NSP technician enters technician identification parameters, comprising an operator identifier and a password, in text fields 310 and 320, respectively. In scrollable text field 330, the NSP technician enters the circuit identifiers 404-555-1122, 404-555-0980, 404-555-2120, and 404-555-3878. The technician identification parameters will be utilized in the processing algorithm of FIG. 4 to verify that the NSP technician is permitted to access information for the circuits requested. The circuit identifiers will be checked for the existence of these circuits, in addition to being used for access verification purposes. The resulting status information for the circuit identifiers which were entered by the NSP technician in scrollable text field 330 appears in records 511 through 514 of FIG. 5.

Referring to FIG. 4, when a NSP technician requests a circuit status report by clicking on a Status Button 340 of a Status/Test Request Form 300 (as shown in FIG. 3), an application server 210 receives a circuit status report request. The application server 210 then executes step 405 and receives the values of the form fields 310, 320, and 330, as shown and discussed in relation to FIG. 3. The application server 210 validates the operator ID 310 and password 320 fields in step 410. This is accomplished by comparing the entries for those fields against entries in a password file of valid NSP technicians. Such a file may be stored in a technician authorization database, which may be implemented within a NMS database 151, an application server database 215, a circuit database 161 or another database, in alternative embodiments. Note that, in the embodiment shown, communications between the application server 210 and the NMS database 151 or the circuit database 161 take place via the NMS 150 or the circuit database server 160, respectively. The application server 210 receives a technician access authorization (indicating that either access is denied or allowed) from the technician authorization database.

In step 420, the application server 210 verifies the existence of the one or more circuits for which the NSP technician has requested status information. This step may be performed by the application server 210 querying the circuit database server 160 with the circuit identifier and receiving a circuit verification (which comprises a circuit existence identifier, having (in one embodiment) such values as "Y" the circuit exists and is installed, "S" the circuit is scheduled to be installed, or "N" the circuit does not exist) for each communication circuit identifier. In an alternative embodiment, a circuit verification comprises a circuit existence identifier and a circuit ownership identifier (such as an owner name) value pair.

If the circuit is not found at step 420, then in step 425 an error message is sent by the application server 210 to, and displayed on, the NSP technician's computer 240, and processing exits at step 470 (e.g., the technician is asked to select another circuit). If the circuit does exist in the NMS database 151 (step 420), then control passes to step 430.

At step 430, a record from the NMS database 151, containing the requested circuit identification number, is parsed to obtain an "owner" field. The owner of a communications circuit is the RBOC customer that has purchased/leased the circuit, and therefore is given access privileges to status, billing, test and other information concerning that particular circuit. In an embodiment, an owner field comprises a circuit ownership identifier. If the application server 210 determines by comparison (of the owner field value vice the requesting NSP name), that the owner of the circuit is not the NSP (for which the NSP technician works), then in step 425 an error message is displayed on the NSP technician's computer 240 and processing exits at step 470. If the NSP is the circuit owner, as determined by the comparison process, then control passes to step 435.

Once the NSP is identified as the circuit owner, then in step 435 the application server 210 formulates a circuit status report request query for a circuit database server 160 in step 435. In step 440, the application server 210 sends the circuit status report request query to the circuit database server 160, which subsequently queries the circuit database 161.

Upon receiving a circuit status request, the circuit database 161 returns a record containing the circuit identifier to the circuit database server 160. This returned record contains fields comprising status information for the circuit in question.

In step 445, the application server 210 receives a response from the circuit database server 160. This response comprises circuit status information. In an embodiment, circuit status information may include such data as that presented in table 510 of an Installation Status Report 500. In the embodiment shown in FIG. 5, the circuit status information for record 511 includes a circuit type value ("A" for ADSL), a circuit number value (404-555-1122), an installation indicator ("Y" for yes), and an installation date (070801, meaning the circuit was installed on Jul. 8, 2001). An Installation Status Report 500 is discussed subsequently in the detailed description of FIG. 5.

The application server 210, at step 450, formats the query response received from the circuit database server 160 and creates a circuit status report comprising the circuit status information. An exemplary circuit status report (i.e., an Installation Status Report 500) is shown in FIG. 5. The circuit status report may then be transmitted by the application server 210 to a follow-on system. In alternative embodiments, follow-on systems comprise a browser executing on a remotely-located NSP technician computer 240, an email system, and a storage system (such as a database). In the embodiment shown, the circuit status report is transmitted to the NSP technician computer 240. Processing then exits at step 470.

FIG. 5 illustrates an exemplary circuit status report 500 (installation status report). This exemplary report is comprised of a table 510 of circuit status records. The circuit status records comprise fields such as a circuit type, a circuit number, a flag indicating whether the circuit has been installed or scheduled to be installed, and a date (of installation or scheduled installation) in one such embodiment.

Record 511 of FIG. 5 indicates that circuit number (404) 555-1122 was installed on Jul. 8, 2001 (070801). Highlighted record number 512 indicates that circuit number (404) 555-0980 was installed on Aug. 1, 2001 (080101). Record 513 of FIG. 5 indicates that circuit number (404) 555-2120 is scheduled to be installed on Dec. 1, 2001 (120101). Dec. 1, 2001 is a date in the future, and therefore indicates that the circuit has been scheduled to be installed. Record 514 indicates that circuit number (404) 555-3878 has not been installed or scheduled for installation.

A Test Button 520 on the installation status report 500 is enabled when a circuit record is highlighted (i.e., selected) by the NSP technician. Since record 512 is highlighted in FIG. 5, the Test Button 520 is enabled. Selecting an enabled Test Button 520 causes the circuit associated with the highlighted record to be selected for testing purposes, and displayed in the test instructions form 600 of FIG. 6. Selecting an Exit Button 525 removes the form from the NSP technician's browser and returns the browser to a previous or a pre-set URL, in alternative embodiments.

Figure 6:
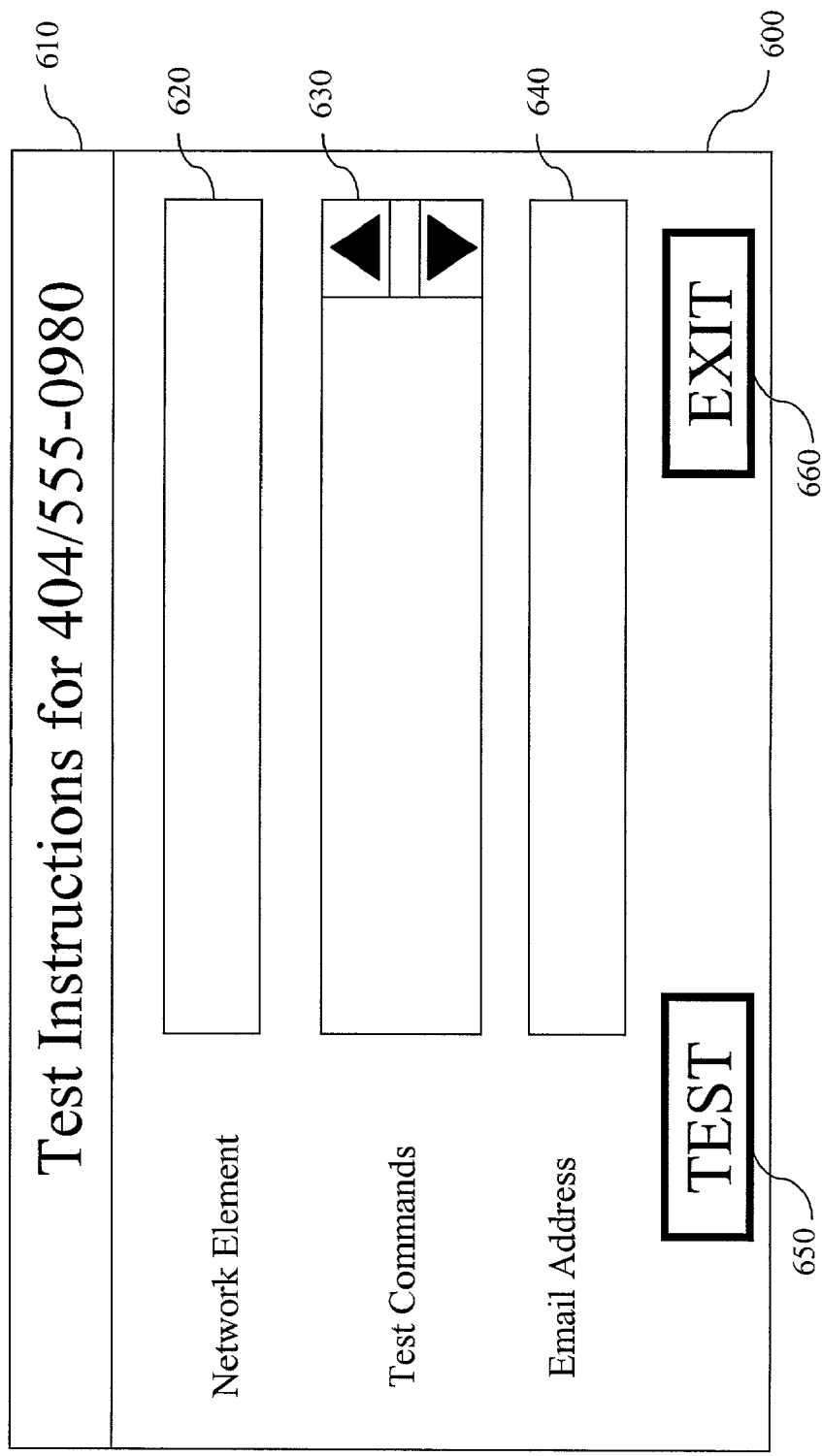
FIG. 6 comprises an exemplary graphical user interface for allowing an NSP technician to perform automated testing of a communications circuit.

FIG. 6 illustrates an exemplary form for accepting test instructions from an NSP operator. A Test Instructions Form 600 is presented on the NSP technician's computer 240 and displays the circuit identification number of the circuit to be tested in the title bar 610 of the form. A circuit identification number identifies a communication circuit and may be, in alternative embodiments, a telephone number, a network address (such as a Media Access Control or MAC address), an Internet Protocol or IP address, or Virtual Path Identifier/Virtual Channel Identifier (VPI/VCI) pairs).

A NSP technician selects the network element to test from a pull down menu 620. Example network elements that may be selected by an NSP technician from pull down menu 620 include a multiplexer 112 and an ATU-R 101. The NSP technician also selects test commands from a test command check box 630. The test commands that are available to the NSP technician are those commands that are valid for management and testing of the selected network element in pull down 620. Note that in various embodiments, command types may include management, testing, provisioning, maintenance, and status commands. Examples of management (and test, provisioning, status and maintenance) command types include TL1 commands (a Bellcore-developed standard set of ASCII instructions used as a test and management protocol), Mechanized Loop Test (MLT) commands, Simple Network Management Protocol (SNMP) commands, and vendor-specific commands. The terms network element, network entity, and network device are used interchangeably to mean any component, including the media, used to implement a communications path. The NSP technician is also provided with a text field 640 for entering an email address to which an electronic results report may be sent.

After the NSP technician has selected a network element to test (in pull down menu 620) and has chosen the test commands to be executed (in test command check box 630), the Test Button 650 is enabled. Entry of an email address in the email address text field 640 is optional in the embodiment shown. Upon selection of the enabled Test Button 650, the selected fields from the Test Instructions Form 600 are sent to the application server 210 for processing in accordance with the flow diagram of FIG. 7, in one embodiment. By selecting a Cancel Button 660, the NSP technician cancels the Test Instruction Form 600 without invoking the processing described in FIG. 7.

Figure 7:
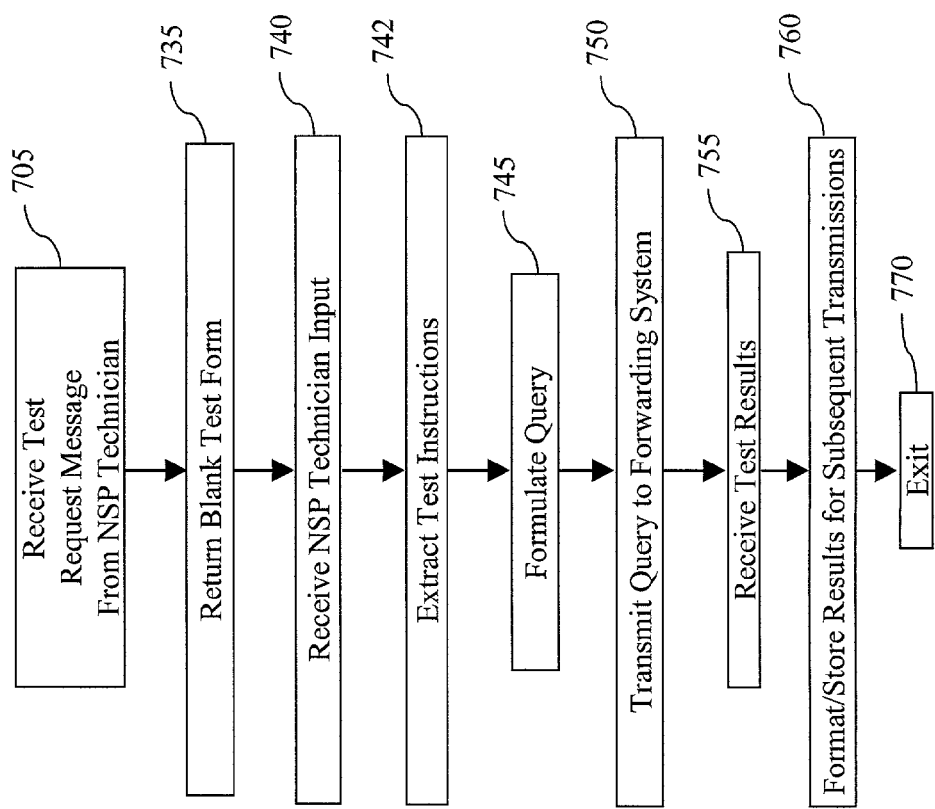
FIG. 7 comprises a flow diagram of an exemplary mechanism for allowing a NSP technician to perform automated testing of a communications circuit.

FIG. 7 comprises a flow chart of an exemplary processing algorithm implemented by the present invention. Such a process enables a NSP technician to perform automated testing of communications circuits.

The processing algorithm shown in FIG. 7 is actuated by the application server 210 when an operator selects a circuit, such as record 512, and clicks on Test Button 520 in FIG. 5. Upon selection of Test Button 520, application server 210 receives from a NSP technician a test request message (or a management request message) comprising a communication circuit identifier in step 705. In response to this request, application server 210 (in step 735) returns a blank Test Instructions Form 600 for the circuit selected (see record 512 in FIG. 5) to the browser running on the NSP technician's computer 240. The application server 210 receives the NSP technician's input (i.e., test instructions) to the Test Instructions Form 600 in step 740, and in step 742 extracts the test instructions from the received input. In an embodiment, test instructions comprise a network element identifier and at least one test command, which is associated with the network element identifier and will be executed by the network element or by the element management system responsible for managing the network element. The terms network element, network entity, and network device are used interchangeably herein to mean any component, including the media, used to implement a communications path or circuit.

The application server 210 formulates a query (i.e., a test request message) comprising the network element identifier and associated test commands and sends that query to a forwarding system in step 750. A forwarding system is an intermediate system, located between an application server 210 and a network element that is being tested or managed. The forwarding system accepts a management request message (comprising a test command in this embodiment) from the application server 210, then formats and transmits or forwards the request message to the network element under test (in this embodiment). The network element then returns a response (i.e., test or management results) via the forwarding to the application server 210.

A forwarding system may be a NMS 150, an EMS140, 145, or an OSS 138, in various embodiments. The forwarding system extracts the test commands and network element identifier from the query sent by the application server 210. In the exemplary embodiment discussed, a forwarding system comprises a NMS 150. In such a case, the NMS 150 (i.e., the forwarding system) communicates the requested test scenario through an EMS 140 to a multiplexer network element 112. The multiplexer network element 112 then executes the test commands selected by the NSP technician in the test command check box 630 of the Test Instructions Form 600. The test results are subsequently communicated from the multiplexer network element 112 to the NMS 150 via the EMS 140. The application server 210 then receives the test results from the NMS 150 (i.e., the forwarding system) in step 755.

The received test results may be formatted or composed into a test report and stored at step 760 in the application server database 215 for subsequent transmission to a follow-on system. In one embodiment, a link may be provided for an NSP technician to access a web-based form for presenting the stored test results via the Internet 230 or another network. Test results may also be transmitted via email, if a NSP technician had previously entered an optional email address in the email address field 640 of the Test Instruction Form 600, as discussed regarding FIG. 6. Processing exits at step 770 of FIG. 7.

Figure 8:
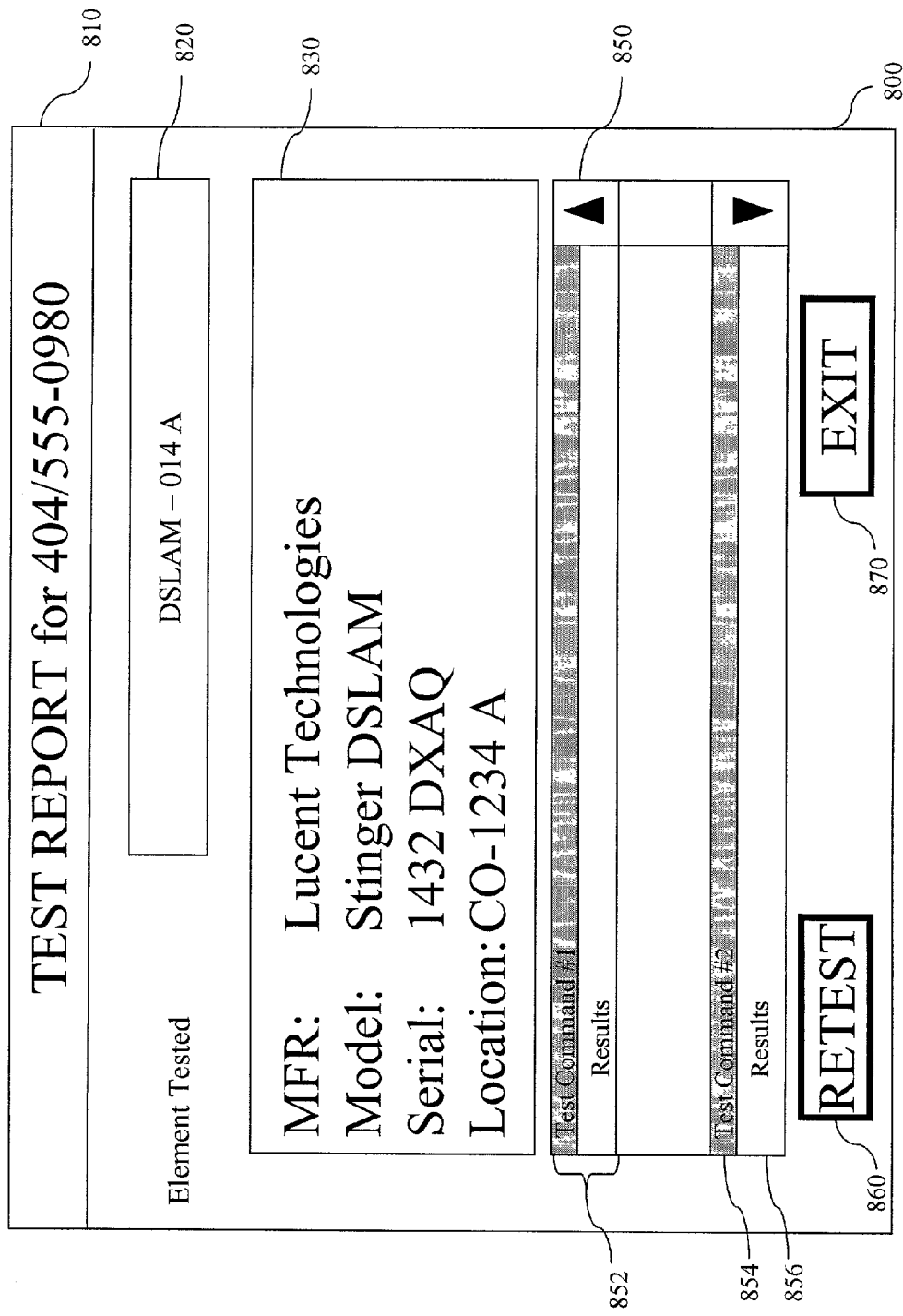
FIG. 8 comprises an exemplary graphical user interface for displaying test results for the testable entities of a communications circuit.

An example format of a web-based test report is shown in FIG. 8. The exemplary Test Report 800 of FIG. 8 is comprised of a descriptive title bar 810, a network element tested text field 820, a description text field 830, and a results scrollable text field 840. The test report title bar 810 displays the circuit identifier, which is (404) 555-0980 in this example. In an exemplary embodiment, a network element (NE) tested text field 820 comprises a generic network element name (i.e., DSLAM or Digital Subscriber Line Access Multiplexer) and a device identifier (014A). In another embodiment, a network element (NE) tested text field 820 contains only a network device identifier. A network device identifier or identification number may be a facility-specific number, which is used to identify network elements in a particular facility, such as the Central Office 110 located nearest to the NSP facility 100. A description text field 830 comprises more detailed information on the tested network element. Such information may include a vendor name, a model number, a serial number and a location of the tested network element.

A results scrollable text field 850 is comprised of at least one result value pair 852. A result value pair 852 is further comprised of a command 854 and a result 856. Each command 854 was selected by a NSP technician in check box 630 of a Test Instructions Form 600. Each result 856 was returned by the network element listed in text field 820 in response to the command 854. Each result 856 may also include additional information such as the date and time the command 854 (i.e., the test) was performed. If a NSP technician, using a Test Instructions Form 600, had selected multiple test commands from the check box 630, then multiple result value pairs 852 would appear in the results scrollable text field 850 of a Test Report Form 800. In an embodiment, multiple result value pairs 852 may be displayed in different frames to distinguish between each result value pair 852. Additionally, a command 854 may be visually distinguished from a result 856 by using highlighting techniques such as bolding, underlining, modifying text foreground and/or background attributes, and modifying fonts.

A Retest Button 860 and a Close Button 870 may be provided in embodiments of the present invention. By selecting the Retest Button 860, a NSP technician may retest the network element listed in text field 820. In alternative embodiments, the retest may be performed using all or a subset of the commands (i.e., the 852 values) found in the results scrollable text field 850. The test commands 852 are resubmitted by an application server 210 to a forwarding system, such as a NMS 150. Essentially, steps 745 through 770 of FIG. 7 are re-executed. These steps are discussed with the detailed description of FIG. 7.

When a NSP technician selects a Close Button 870, the Test Report Form 800 is removed from the NSP technician's browser. The NSP technician's browser may then display a previously viewed or a pre-set URL in alternative embodiments.

Embodiments of the present invention also provide a NSP technician with the capability of performing copper pair testing using a standardized test system, such as Mechanized Loop Testing (MLT). MLT, which was developed by Lucent Technologies, is a test platform that adheres to the ANSI (American National Standards Institute) standard T1.263-1998. Conventionally, a MLT system is often implemented as a testing subsystem within an OSS 138.

In an embodiment of FIG. 6, MLT commands may be input (or selected) by a NSP technician in a command check box 630 of a Test Instructions Form 600. The selected MLT commands are received and extracted by an application server 210 (see steps 740 and 742), and a query message is formatted and transmitted to a forwarding system (steps 745 and 750, respectively). In alternate embodiments, the forwarding system may be a NMS 150 or an OSS 138. If the forwarding system is a NMS 150, then the forwarding system subsequently forwards the MLT commands to an OSS 138.

The MLT commands are queued up for testing on the OSS 138. The tests specified by the MLT commands include, but are not limited to, load coil detection, loop length measurement, bridge tap detection, and wideband noise. The OSS 138 executes the MLT commands, and returns test results to a NMS 150 via a NOC LAN 137, in an embodiment in which a NMS 150 is the forwarding system. In such a case, the NMS 150 subsequently transmits the test results. The application server 210 receives the test results (step 755), formats those results into a test report, and stores a copy of the test report in an application server database 215 (step 760). The test report may be subsequently transmitted to a follow-on processing system, such as a remotely located NSP technician computer 240 hosting a browser application, an email system, or secondary storage, such as a database.

The test report may also be made available to an NSP technician via the Internet 230 by invocation of a URL associated with the test report.

xDSL modems, such as an ATU-R (ASDL Transceiver Unit-Remote), may also be tested using a similar procedure as that described for copper pair testing. To test an ADSL modem, a NSP technician first selects an ATU-R device from a pull down menu 620 of testable entities. The NSP technician then selects test commands from a test command check box 630 and clicks on a Test Button 650, as previously illustrated and explained regarding FIG. 6.

Processing continues as discussed in FIG. 7 (at this point from step 740 in FIG. 7). The testable device (i.e., an ATU-R) and test commands selected by the NSP technician are received by an application server 210 (step 740), extracted (step 742), placed in a query message (step 745), and transmitted to a forwarding system (step 750). In alternative embodiments, the forwarding system may be a NMS 150 or an OSS 138. If the forwarding system is a NMS 150, then the forwarding system subsequently transmits (or forwards) the ATU-R test commands to an OSS 138.

The ATU-R test commands are queued up for testing on the OSS 138. The OSS 138 executes the ATU-R test commands, and returns the test results to a NMS 150 via a NOC LAN 137, in an embodiment in which a NMS 150 is the forwarding system. In such a scenario, the NMS 150 subsequently sends the test results to the application server 210, which formats the results into a Test Report 800, and stores a copy of the report on an application server database 215. The Test Report 800 may be subsequently forwarded to a follow-on processing system, such as a NSP technician computer 240, an email system, or secondary storage (including a database). The Test Report 800 is also made available to an NSP technician via the Internet 230 by the technician invoking a URL associated with the Test Report 800. In one such an embodiment, a Test Report 800, as shown in FIG. 8, is displayed in a browser application on a NSP technician computer 240.

A results scrollable text field 850 contains test results for each command executed by the OSS 138. In an embodiment, the test results may be formatted as a series of results value pairs 852, as discussed regarding FIG. 8.

Additionally, a NSP technician may repeat the test scenario for the ATU-R by selecting a Retest Button 860. In alternative embodiments, such an action queues all or a subset of the ATU-R test commands 854 on an OSS 138, and the previously described ATU-R testing process is repeated. By selecting the Close Button 870 of a Test Report 800 shown in FIG. 8, the NSP technician dismisses the test report and returns to another web page within the technician's browser, in one embodiment.

Various embodiments of the present invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention. For instance, test commands, results and reports are utilized and generated in one embodiment. In other embodiments, management, provisioning, status and maintenance commands, results and reports may be utilized and generated using the methods and systems set forth herein.

What is claimed is:

1. A method of providing communication circuit status information via a network interface session, wherein the method comprises:

receiving a status report request from a network service provider technician;

determining a network service provider for whom the technician requesting the status report works;

the status report request identifying at least one communication circuit identifier for which the network service provider technician request status;

determining an entity operating the at least one communication circuit;

comparing the entity to the network service provider;

terminating access to the communications circuit status information if the entity is not the network service provider;

communicating the at least one communication circuit identifier to a circuit database server;

receiving a circuit verification for each at least one communication circuit identifier;

communicating the status report to the circuit database server;

receiving circuit status information from the circuit database server;

creating a status report comprising the circuit status information; and transmitting the status report to a follow-on system.

2. The method of claim 1, further comprising receiving technician identification parameters.

3. The method of claim 2, further comprising communicating the technician identification parameters to a technician authorization database.

4. The method of claim 3, further comprising receiving a technician access authorization from the technician authorization database.

5. The method of claim 1, wherein the status report comprises an installation date for the at least one communication circuit identifier.

6. The method of claim 1, wherein the follow-on system comprises a remotely located computer for display of said status report.

7. The method of claim 1, wherein the follow-on system comprises a storage system.

8. The method of claim 1 wherein the follow-on system comprises an email system.

9. The method of claim 1, wherein the circuit verification comprises a circuit existence identifier and circuit ownership identifier value pair.

* * * * *